United States Patent Office 3,470,215
Patented Sept. 30, 1969

3,470,215
SYNTHESIS OF 10-ISOGONENES AND
DERIVATIVES THEREOF
George C. Buzby, Jr., Philadelphia, and Herchel Smith, Wayne, Pa., assignors to American Home Products Corporation, New York, N.Y., a corporation of Delaware
No Drawing. Filed Apr. 4, 1967, Ser. No. 628,274
Int. Cl. C07c *169/66, 169/22;* A61k *27/00*
U.S. Cl. 260—397.3                                10 Claims

ABSTRACT OF THE DISCLOSURE

The compounds of the class of 5,13-dialkyl-10-isogonan-3-one compounds useful as anti-androgenic agents.

BACKGROUND OF THE INVENTION

This invention relates to the field of new physiologically active 5,13-dialkyl-10-isogonan-3-one compounds, novel processes for their preparation and new intermediates useful in the preparation thereof.

In Belgian Patent No. 638,080 there is described the preparation 13-alkyl-17-hydroxygon-4-en-3-ones which have anabolic and progestational activity.

SUMMARY OF THE INVENTION

More particularly, this invention is directed to a compound of the formula:

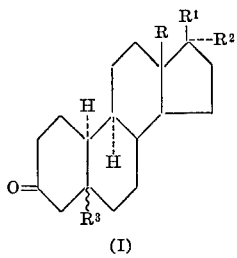

(I)

wherein ($\xi$) represents the alpha or beta positions; R and $R^3$ are each alkyl groups of less than 5 carbon atoms; $R^1$ is selected from the group consisting of hydroxy and acyloxy; $R^2$ is selected from the group consisting of hydrogen, and alkyl of less than 5 carbon atoms, and together $R^1$ and $R^2$ is oxo (=O).

The final products of this invention are physiologically active substances which are useful as anti-androgenic agents. Hence, they may be administered in lieu of known anti-androgenic agents, such as A-norprogesterone.

The compounds may be formulated for such administration based on the activity of the particular compound and the requirements of the patient.

DESCRIPTION OF THE PREFERRED EMBODIMENTS

The compounds of this invention may be prepared according to the process of this invention which may be represented by the following reaction scheme wherein R, $R^1$, $R^2$ and $R^3$ are as hereinbefore defined:

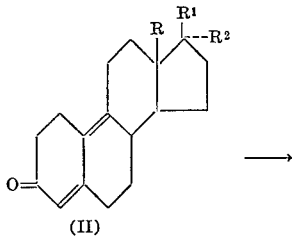

(II)

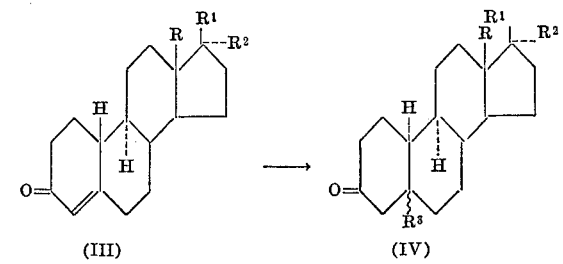

(III)              (IV)

According to one feature of this invention, 13-alkyl-gona-4,9-diene-3-one compounds of Formula II are reduced with hydrogen in the presence of a noble metal catalyst, such as palladium oxide on strontium carbonate, in an inert organic solvent to yield the novel intermediates 13-alkyl-10α-gon-4-en-3-one compounds of Formula III.

The initial 13-alkylgona-4,9-dien-3-one compounds (II) may be prepared in accordance with any prior art processes such as described in said Belgian Patent No. 638,080.

The 13-alkyl-10α-gon-4-en-3-ones (III) are treated with an organo-metal compound, such as a Grignard compound, to yield the 5,13-dialkyl-10-isogonan-3-one compounds of Formula IV, which are the pharmacologically active products of this invention.

To prepare the 3,17-dione compounds of this invention, the corresponding 5,13-dialkyl-17-hydroxy-10-isogonan-3-one compounds are oxidized by any conventional method, such as treatment with Jones reagent.

The following examples illustrate the invention (all temperatures being in centigrade):

EXAMPLE 1

13,17-diethyl-17β-hydroxy-10α-gon-4-en-3-one 1.0 gm. of 13,17-diethyl-17β-hydroxygona-4,9-dien-3-one in 30 ml. of benzene is added to 300 mg. of 2% PdO/SrCO₃ previously reduced. Uptake of one mole of hydrogen requires one half hour. The catalyst is filtered, the filtrate concentrated to dryness and the solid residue is triturated with ether to yield 0.275 gm. of 13,17-diethyl-17β-hydroxy-10α-gon-4-en-3-one, M.P. 185–187°. Recrystallization from ethyl acetate gave 0.220 gm. of pure product, M.P. 189–191°;

$\lambda_{max}^{KBr}$ 2.9, 6.05μ; $\lambda_{max}^{KBr}$ 244 ($\epsilon$ 15,825).

*Analysis.*—Calcd. for $C_{21}H_{32}O_2$ requires: C, 79.70; H, 10.19. Found: C, 79.48; H, 10.11.

EXAMPLE 2

13,17-diethyl-17β-hydroxy-10α-gon-4-en-3-one,
17-acetate

Following the procedure of Example 1, but substituting 13,17-diethyl-17β-hydroxygona-4,9-dien-3-one, 17-acetate for 13,17-diethyl-17β-hydroxygona-4,9-dien-3-one there is obtained 13,17 - diethyl-17β-hydroxy-10α-gon-4-en-3-one, 17-acetate.

EXAMPLE 3

13-ethyl-17-methyl-17β-hydroxy-10α-gon-4-en-3-one

Following the procedure of Example 1, but substituting 13 - ethyl-17-methyl-17β-hydroxygona-4,9-dien-3-one for 13,17-diethyl-17β-hydroxygona-4,9-dien-3-one there is obtained 13 - ethyl-17-methyl-17β-hydroxy-10α-gon-4-en-3-one.

EXAMPLE 4

13-ethyl-17-propyl-17β-hydroxy-10α-gon-4-en-3-one

Following the procedure of Example 1, but substituting 13 - ethyl-17-propyl-17β-hydroxygona-4,9-dien-3-one for 13,17-diethyl-17β-hydroxygona-4,9-dien-3-one there is obtained 13-ethyl-17-propyl-17β-hydroxy-10α-gon-4-en-3-one.

EXAMPLE 5

13-ethyl-17-butyl-17β-hydroxy-10α-gon-4-en-3-one

Following the procedure of Example 1, but substituting 13 - ethyl-17-butyl-17β-hydroxygona-4,9-dien-3-one for 13,17-diethyl-17β-hydroxygona-4,9-dien-3-one, there is obtained 13 - ethyl-17-butyl-17β-hydroxy-10α-gon-4-en-3-one.

EXAMPLE 6

13-propyl-17-methyl-17β-hydroxy-10α-gon-4-en-3-one

Following the procedure of Example 1, but substituting 13 - propyl - 17 - methyl-17β-hydroxygona-4,9-dien-3-one for 13,17 - diethyl - 17β-hydroxygona-4,9-dien-3-one, there is obtained 13-propyl-17-methyl-17β-hydroxy-10α-gon-4-en-3-one.

EXAMPLE 7

13-butyl-17-methyl-17β-hydroxy-10α-gon-4-en-3-one

Following the procedure of Example 1, but substituting 13 - butyl - 17 - methyl - 17β-hydroxygona-4,9-dien-3-one for 13,17 - diethyl - 17β-hydroxygona-4,9-dien-3-one there is obtained 13 - butyl - 17 - methyl-17β-hydroxy-10α-gon-4-en-3-one.

EXAMPLE 8

13,17-diethyl-17β-hydroxy-5-methyl-10α-gonan-3-one 0.390 gm. of 13,17-diethyl-17β-hydroxy-10α-gon-4-en-3-one in 10 ml. of dry tetrahydrofuran is added to 20 ml. of dry tetrahydrofuran containing 10 ml. of 3 M methyl magnesium bromide and CuCl (.40 g.) at −18°. The reaction, under $N_2$, is allowed to reach room temperature, stirred for ½ hour and poured into brine saturated with hydrogen chloride. Ether extraction, washing of the ether layer, drying and removal of solvent yields a solid which is chromatographed on 26 gm. of fuller's earth. Elution with 3% ether-benzene followed by recrystallization from ether-hexane then again from ether gave 0.09 g. of 13,17-diethyl - 17β - hydroxy-5-methyl-10α-gonan-3-one, M.P. 186–187° C., $\lambda_{max}^{KBr}$ 2.85, 5.86

Analysis.—Calcd. for $C_{22}H_{36}O_2$ requires: C, 79.46; H, 10.92. Found: C, 79.73; H, 10.68.

Similarly, by following the procedure of Example 8, but substituting another Grignard reagent for the methyl magnesium bromide, such as ethyl magnesium bromide, propyl magnesium bromide, butyl magnesium bromide, and the like, the corresponding 5-alkyl derivative is obtained.

EXAMPLE 9

13,17-diethyl-17β-hydroxy-5-methyl-10α-gonan-3-one, 17-acetate

Following the procedure of Example 8, but substituting 13,17 - diethyl - 17β - hydroxy - 10α-gon-4-en-3-one, 17-acetate for 13,17 - diethyl - 17β-hydroxy-10α-gon-4-en-3-one there is obtained 13,17-diethyl-17β-hydroxy-5-methyl-10α-gonan-3-one, 17-acetate.

EXAMPLE 10

13-ethyl-17-methyl-17β-hydroxy-5-methyl-10α-gonan-3-one

Following the procedure of Example 8, but substituting 13 - ethyl - 17 - methyl - 17β-hydroxy-10α-gon-4-en-3-one for 13,17 - diethyl - 17β - hydroxy-10α-gon-4-en-3-one there is obtained 13 - ethyl - 17-methyl-17β-hydroxy-5-methyl-10α-gonan-3-one.

EXAMPLE 11

13-ethyl-17-propyl-17β-hydroxy-5-methyl-10α-gonan-3-one

Following the procedure of Example 8, but substituting 13 - ethyl - 17 - propyl - 17β-hydroxy-10α-gon-4-en-3-one for 13,17 - diethyl - 17β - hydroxy-10α-gon-4-en-3-one, there is obtained 13 - ethyl - 17 - propyl-17β-hydroxy-5-methyl-10α-gonan-3-one.

EXAMPLE 12

13-ethyl-17-butyl-17β-hydroxy-5-methyl-10α-gonan-3-one

Following the procedure of Example 8, but substituting 13 - ethyl - 17 - butyl - 17β-hydroxy-10α-gon-4-en-3-one for 13,17 - diethyl - 17β - hydroxy-10α-gon-4-en-3-one, there is obtained 13-ethyl-17-butyl-17β-hydroxy-5-methyl-10α-gonan-3-one.

EXAMPLE 13

13-propyl-17-methyl-17β-hydroxy-5-methyl-10α-gonan-3-one

Following the procedure of Example 8, but substituting 13 - propyl - 17 - methyl - 17β-hydroxy-10α-gon-4-en-3-one for 13,17 - diethyl - 17β-hydroxy-10α-gon-4-en-3-one there is obtained 13 - propyl - 17 - methyl-17β-hydroxy-5-methyl-10α-gonan-3-one.

EXAMPLE 14

13-butyl-17-methyl-17β-hydroxy-5-methyl-10α-gonan-3-one

Following the procedure of Example 8, but substituting 13 - butyl - 17 - methyl - 17β-hydroxy-10α-gon-4-en-3-one for 13,17 - diethyl - 17β-hydroxy-10α-gon-4-en-3-one, there is obtained 13 - butyl - 17 - methyl-17β-hydroxy-5-methyl-10α-gonan-3-one.

EXAMPLE 15

13-ethyl-5-methyl-10α-gonane-3,17-dione (A) Following the procedure of Example 8, but substituting 13 - ethyl - 17β - hydroxy-10α-gon-4-en-3-one for 13,17 - diethyl - 17β - hydroxy-10α-gon-4-en-3-one there is obtained 13 - ethyl - 17β-hydroxy-5-methyl-10α-gonan-3-one.

(B) Treatment of the resulting 13-ethyl-17β-hydroxy-5-methyl-10α-gonan-3-one with a Jones reagent yields 13-ethyl-5-methyl-10α-gonane-3,17-dione.

It is understood that either the dl-steroids or the specific d- or l-isomers may be employed as starting materials with like results.

It is further understood that both 5α- and 5β-steroids are included within the scope of the invention.

What is claimed is:
1. A compound of the formula

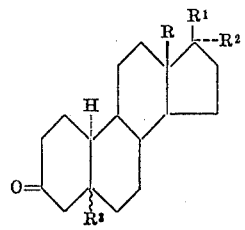

where R is an alkyl of 2 to 4 carbon atoms; $R^3$ is an alkyl of less than 5 carbon atoms; $R^1$ is selected from the group consisting of hydroxy and lower acyloxy; $R^2$ is selected from the group consisting of hydrogen and alkyl of less than 5 carbon atoms; and together $R^1$ and $R^2$ is oxo(=O).

2. A compound according to claim 1 having the structural formula

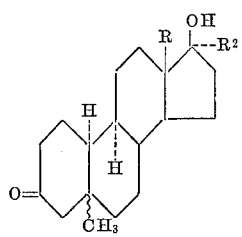

wherein R and R² are as hereinbefore defined.

3. A compound according to claim 2 that is 13,17-diethyl-17β-hydroxy-5-methyl-10α-gonan-3-one.

4. A compound according to claim 1 that is 13,17-dialkyl - 17β-hydroxy-5-methyl-10α-gonan-3-one, 17-acetate.

5. A compound according to claim 1 that is 13,17-dialkyl-17β-hydroxy-5-ethyl-10α-gonan-3-one.

6. A compound according to claim 1 that is 13-alkyl-5-methyl-10α-gonane-3,17-dione.

7. A compound according to claim 1 that is 13-ethyl-17β-hydroxy-5-methyl-10α-gonan-3-one.

8. A compound having the formula

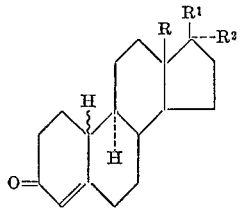

wherein R is an alkyl group of 2 to 4 carbon atoms; R¹ is selected from the group consisting of hydroxy and lower acyloxy; while R² is selected from the group consisting of hydrogen, alkyl of less than 5 carbon atoms.

9. A compound according to claim 8 that is 13,17-diethyl-17β-hydroxy-10α-gon-4-en-3-one.

10. A process for preparing the compounds of claim 1 which comprises the steps of:

(A) Catalytically reducing a compound of the formula

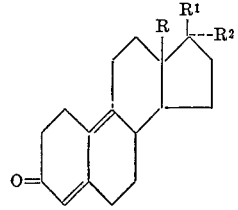

wherein R, R¹ and R² are as hereinbefore defined in claim 8, so as to form the compound of claim 8, and then, (B) treating the compound formed with a lower alkyl magnesium halide.

References Cited

UNITED STATES PATENTS 3,341,558  9/1967  Farkas _____ 260—397.3

OTHER REFERENCES

Mori, Chem. and Pharm. Bull. 10, May 1962, pp. 382–86.

ELBERT ROBERTS, Primary Examiner

U.S. Cl. X.R.

260—397.4, 999